T. J. McWILLIAMS.
HARROW.
APPLICATION FILED MAR. 18, 1910.
976,387.
Patented Nov. 22, 1910.
2 SHEETS—SHEET 1.
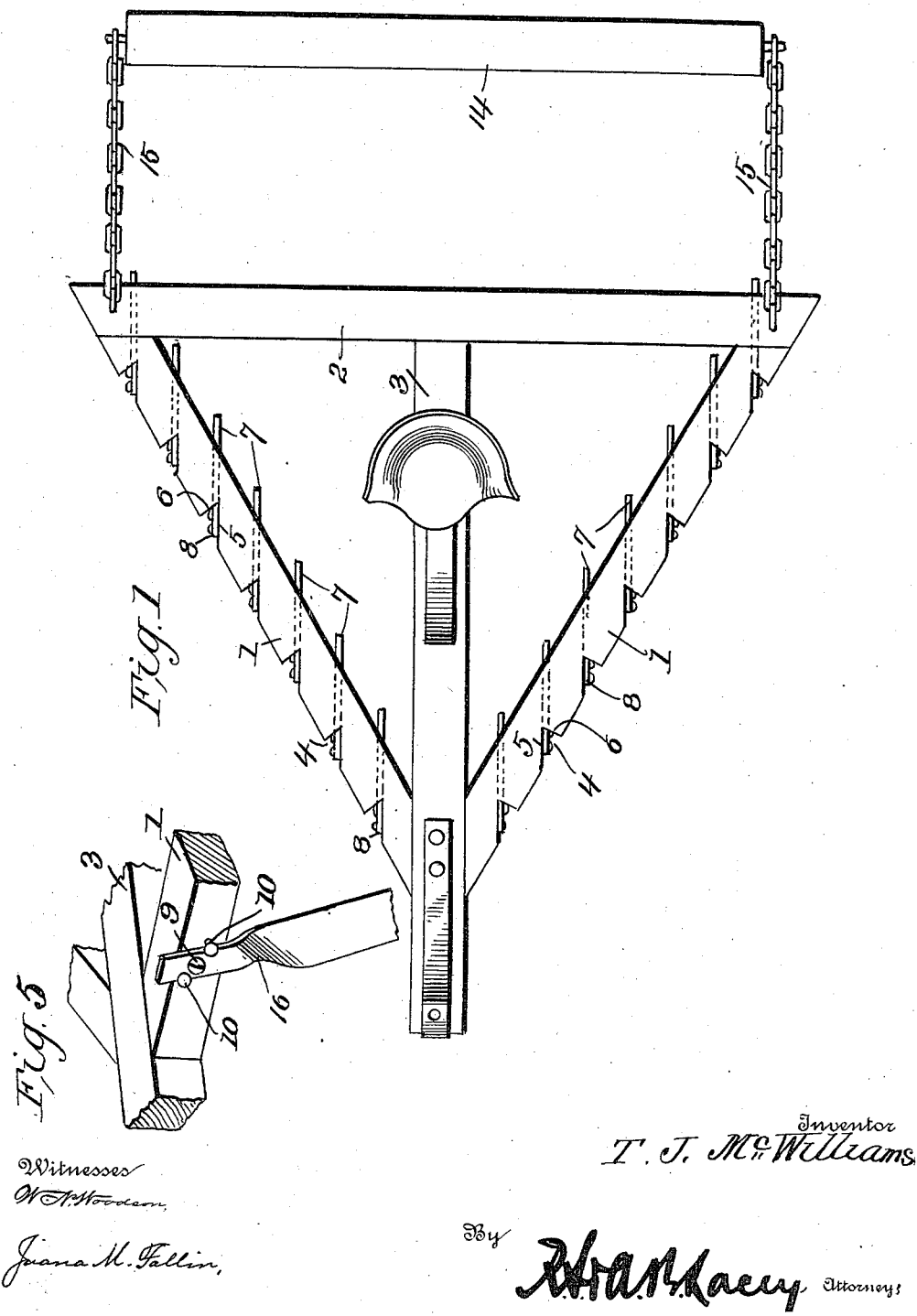

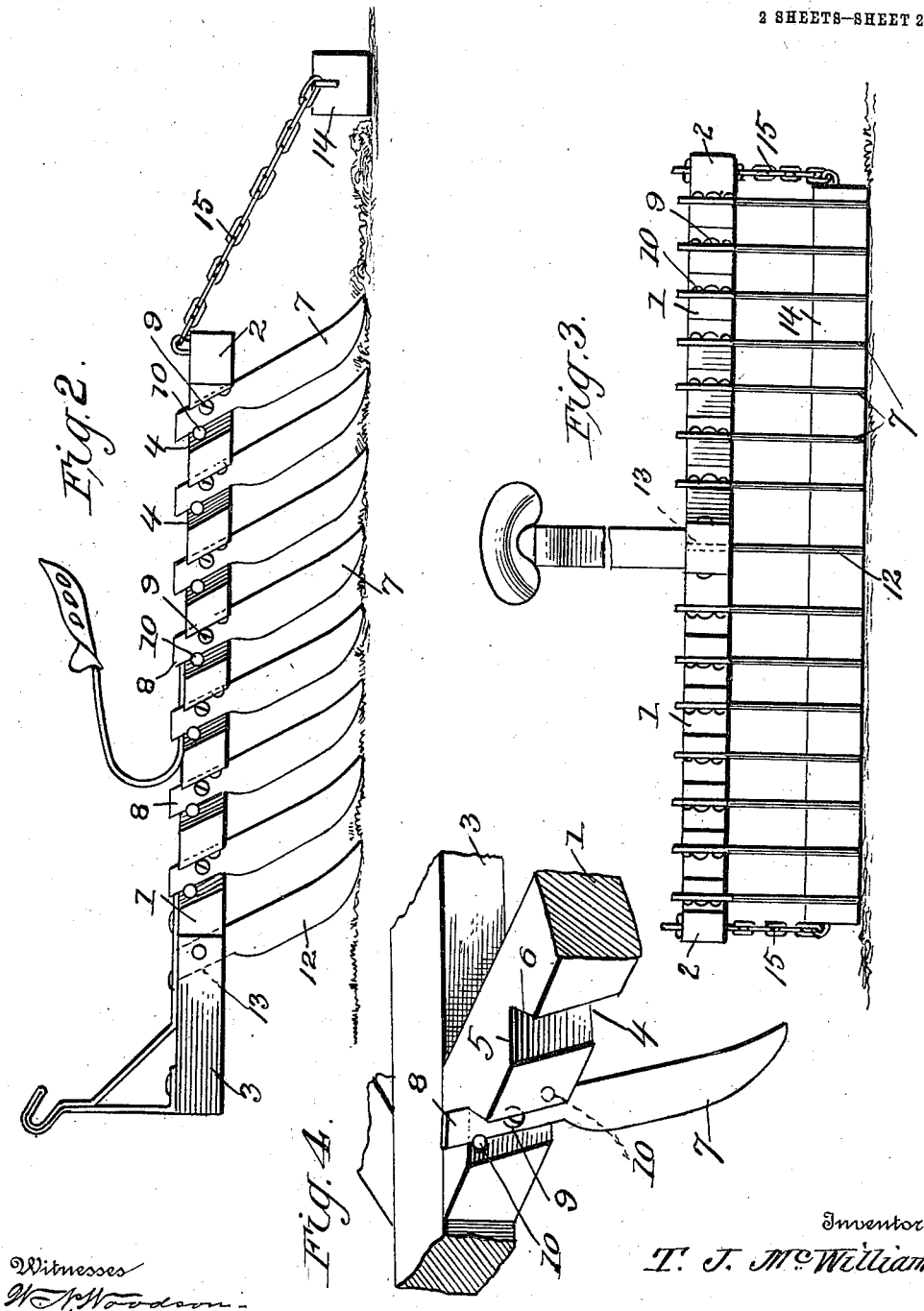

UNITED STATES PATENT OFFICE.

THOMAS J. McWILLIAMS, OF TIMPSON, TEXAS.

HARROW.

976,387.

Specification of Letters Patent. Patented Nov. 22, 1910.

Application filed March 18, 1910. Serial No. 550,228.

*To all whom it may concern:*

Be it known that I, THOMAS J. MCWIL-LIAMS, citizen of the United States, residing at Timpson, in the county of Shelby and State of Texas, have invented certain new and useful Improvements in Harrows, of which the following is a specification.

The present invention comprehends certain new and useful improvements in agricultural implements and the invention has for its object an improved harrow which is designed particularly for use on sodded land and is arranged to cut the sod into slices, a drag attachment being connected to the harrow for the purpose of breaking up the slices and thus preparing the ground for cultivation.

A further object of the invention is a harrow in which the teeth are secured to the harrow frame in a particularly efficient manner so as to be braced against excessive strain and to be positively held against accidental displacement.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a top plan view of a harrow constructed in accordance with my invention; Fig. 2 is a side elevation; Fig. 3 is a front elevation; and, Fig. 4 is a fragmentary perspective view of one of the side beams showing a tooth attached thereto. Fig. 5 is a detail view illustrating a modification hereinafter specifically described.

Corresponding and like parts are referred to in the following description and indicated in all the views of the drawings by the same reference characters.

The frame of my improved harrow is substantially in the form of a triangle and consists, essentially, of two rearwardly divergent side beams 1 that are connected at their rear ends by a cross beam 2. The forward ends of the side beams are secured on opposite sides of a middle beam 3, which is disposed longitudinally of the harrow frame, that is in the direction of the draft. The middle beam is fastened at its rear end to the cross beam and thus serves to materially reinforce the harrow frame as a whole. The side beams are formed in their outer faces with a series of forwardly inclined notches 4, the notches of each series being preferably spaced apart at regular longitudinal intervals. One wall 5 of each notch lies in a substantially vertical longitudinal plane, while the other wall constitutes a shoulder 6 that faces obliquely, forwardly and downwardly, as shown. The planes of the wall 5 and shoulder 6 are arranged at acute angles with respect to each other so that the shoulder has an undercut formation. The side beams 1 carry series of harrow teeth that in the present instance comprise substantially flat slicing blades 7 and flat shanks 8, the shanks being mounted in the notches 4. Each shank is secured flat against the adjacent wall 5 by means of a single bolt 9, or the like which is inserted therethrough and through the side beam, the rear edge of the shank being arranged in abutting relation to the shoulder 6 so that the tooth is supported in rearwardly inclined position. As a precautionary measure, two studs 10 are preferably driven into the side beam against the front and rear edges of the shank, the rear stud being disposed below the bolt, while the forward stud is located above the same (see Fig. 2). By virtue of such an arrangement the shanks are positively held against turning movement about the bolt as a pivot and hence the side beam is relieved of wear. Attention is here directed to the fact that the undercut formation at the shoulder serves to hold the shank against being displaced laterally and outwardly, as is a manifest desideratum in order to relieve the bolt 9 and studs 10 of loosening strain.

A middle tooth 12 is provided at the front of the harrow between the series of teeth above mentioned, and is substantially similar in structure to such teeth. The middle tooth is inclined rearwardly and has its shank secured in an opening 13 that extends through the forward portion of the middle beam 3. The cutting blades of all of the teeth of the harrow extend obliquely rearwardly and downwardly from the harrow frame and lie in substantially vertically longitudinal planes so as to pass through the ground with a minimum amount of resistance. The forward edges of the cutting blades are sharpened to form knife edges which divide the sod into a plurality of longitudinal slices or strips when the harrow is drawn forwardly over the land to be operated upon.

Disposed behind the harrow frame is a drag attachment which comprises a suitable transverse beam 14 that rests upon the ground and is attached at its ends to the crossbar 2 through the medium of chains 15 or like flexible connections. This beam serves to effectually break up the slices when dragged over the same. The land is thus conveniently prepared for the planting of the crops.

The teeth of the harrow are arranged in V-shape and also in echelon, and hence each tooth travels in a separate path, whereby to cut a maximum number of slices.

From the foregoing description in connection with the accompanying drawing, it will be apparent that I have provided an improved harrow which is quite practical and efficient, which is susceptible of general application and which includes a particularly advantageous arrangement of teeth. The device possesses to a marked degree the characteristics of simplicity, durability and strength, and consists of comparatively few parts, the parts being capable of being easily kept in repair.

In another embodiment of the invention the notches in the side beams are omitted and the shanks of the teeth are secured flat against the outer faces of the side beams, as clearly illustrated in Fig. 5. In this instance the teeth are twisted as indicated at 16, at the juncture of the shanks and cutting blades so as to dispose the latter in longitudinal planes.

Having thus described the invention, what is claimed as new is:

A harrow, comprising a harrow frame, including a beam formed in one side with a plurality of notches providing forwardly facing shoulders, and harrow teeth secured within the notches in abutting relation to the adjacent forwardly facing shoulders, the shoulders being of undercut formation and embracing the teeth to hold the same against lateral displacement.

In testimony whereof I affix my signature in presence of two witnesses.

THOMAS J. his X mark McWILLIAMS. [L. S.]

Witnesses:
T. C. WHITESIDE,
J. F. HAUSTON.